US012124610B2

(12) United States Patent
Oqaily et al.

(10) Patent No.: US 12,124,610 B2
(45) Date of Patent: Oct. 22, 2024

(54) DATA ANONYMIZATION VIEWS

(71) Applicant: TELEFONAKTIEBOLAGET LM ERICSSON (PUBL), Stockholm (SE)

(72) Inventors: Momen Oqaily, Montreal (CA); Yosr Jarraya, Montreal (CA); Mengyuan Zhang, Kowloon (CN); Makan Pourzandi, Montreal (CA); Lingyu Wang, Montreal (CA); Mourad Debbabi, Montreal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 224 days.

(21) Appl. No.: 17/607,697

(22) PCT Filed: Apr. 29, 2020

(86) PCT No.: PCT/IB2020/054045
§ 371 (c)(1),
(2) Date: Oct. 29, 2021

(87) PCT Pub. No.: WO2020/222140
PCT Pub. Date: Nov. 5, 2020

(65) Prior Publication Data
US 2022/0215127 A1 Jul. 7, 2022

Related U.S. Application Data

(60) Provisional application No. 62/840,036, filed on Apr. 29, 2019.

(51) Int. Cl.
G06F 21/62 (2013.01)
H04L 9/40 (2022.01)

(52) U.S. Cl.
CPC ...... *G06F 21/6254* (2013.01); *H04L 63/0421* (2013.01)

(58) Field of Classification Search
CPC ............. G06F 21/6209; G06F 21/6254; G06F 21/606; H04L 63/0421
(Continued)

(56) References Cited

U.S. PATENT DOCUMENTS 8,627,488 B2 * 1/2014 Cormode ......... G11B 20/00086
726/28
9,489,538 B2 11/2016 Vyas et al.
(Continued)

FOREIGN PATENT DOCUMENTS

EP 2416271 A2 2/2012
WO 2014/049605 A1 4/2014

OTHER PUBLICATIONS

Karen Kent and Murugiah Souppaya. 2006. "Guide to computer security log management: recommendations of the National Institute of Standards and Technology.".
(Continued)

*Primary Examiner* — Amare F Tabor
(74) *Attorney, Agent, or Firm* — Ericsson Inc.

(57) ABSTRACT

Systems and methods for anonymizing data are provided herein. A network node can receive privacy constraints from a data owner and utility requirements from at least one data processor. An anonymization mechanism can be selected for each data attribute in a data set, based on its specified privacy constraint and/or utility requirement, from the available anonymization mechanism(s) appropriate for its associated attribute type.

20 Claims, 10 Drawing Sheets

(58) Field of Classification Search
USPC .................................................. 726/25–27
See application file for complete search history.

(56) References Cited

U.S. PATENT DOCUMENTS

| | | | | |
|---|---|---|---|---|
| 11,615,209 | B2* | 3/2023 | Hapfelmeier | G06F 16/00 726/26 |
| 11,681,825 | B2* | 6/2023 | McFall | H04L 9/3213 726/26 |
| 2014/0130178 | A1* | 5/2014 | Agrawal | G06F 21/6209 726/26 |
| 2014/0137262 | A1* | 5/2014 | Stofberg | G06F 21/6218 726/26 |
| 2014/0201847 | A1* | 7/2014 | Ito | G06F 21/6254 726/26 |
| 2014/0283097 | A1* | 9/2014 | Allen | G06F 21/6254 726/26 |
| 2014/0380489 | A1* | 12/2014 | Hacid | G06F 21/6254 726/26 |
| 2015/0169895 | A1* | 6/2015 | Gkoulalas-Divanis | G06F 21/6227 726/26 |
| 2015/0254462 | A1* | 9/2015 | Takahashi | G06F 21/6254 726/26 |
| 2015/0294121 | A1* | 10/2015 | Yamaoka | G06F 16/254 726/26 |
| 2016/0132697 | A1* | 5/2016 | Simske | G06F 21/6254 726/26 |
| 2016/0154977 | A1* | 6/2016 | Jagadish | G06F 21/6254 726/26 |
| 2018/0004978 | A1 | 1/2018 | Hebert et al. | |

OTHER PUBLICATIONS

Hing-Hao Mao, Chung-Jung Wu, Evangelos E Papalexakis, Christos Faloutsos, Kuo-Chen Lee, and Tien-Cheu Kao. 2014. "MalSpot: Multi 2 malicious network behavior patterns analysis. In Pacific-Asia Conference on Knowledge Discovery and Data Mining". Springer, 1-14.

Sean Thorpe, Tyrone Grandison, Arnett Campbell, Janet Williams, Khalilah Burrell, and Indrajit Ray. 2013. "Towards a forensic-based service-oriented architecture framework for auditing of cloud logs". In Services (Services), 2013 IEEE Ninth World Congress on. IEEE, 75-83.

Adam Slagell and William Yurcik. 2005. "Sharing computer network logs for security and privacy: A motivation for new methodologies of anonymization". In Securecomm. IEEE, 80-89.

Ravi S Sandhu. 1993. "Lattice-based access control models". Computer 11 (1993), 9-19.

Fei Li and HV Jagadish. 2014. "Constructing an interactive natural languageinterface for relational databases". Proceedings of the VLDB Endowment 8, 1 (2014), 73-84.

Stanford Parser, CoreNLP. 2018. (2018). Available at: https://stanfordnlp.github.io/CoreNLP/.

International Search Report and Written Opinion for PCT application PCT/IB2020/054045 with mailing date of Jul. 20, 2020.

CAIDA Catalog Search—A Collection of Scientific Research on the Internet, uploaded from the Internet on Oct. 20, 2022.

Rules for the protection of personal data inside and outside the EU. 2018. GDPR. (2018). Available at: https://ec.europa.eu/info/law/law-topic/data-protection_en.

The department of Homeland Security.2018. Homelandsecurity. (2018). Available at: https://www.dhs.gov/dhs-digital-strategy.

The National Strategy to Secure Cyberspace, Feb. 2003.

The New Standard Contractual Clauses—Questions and Answers, Jun. 4, 2021.

* cited by examiner

Fig. 4a - Network data anonymization methods

Fig. 4b - Attribute types and their corresponding anonymization methods

Fig. 4c - Lattices per attribute type

A) Excerpt of the Timestamp type-ontology
B) Excerpt of the Constant-Shifting method-ontology

DATA ANONYMIZATION VIEWS

CROSS REFERENCE TO RELATED APPLICATIONS

This application claims the benefit of U.S. Provisional Application No. 62/840,036 filed on Apr. 29, 2019, the entire contents of which are hereby incorporated by reference.

TECHNICAL FIELD

The present disclosure generally relates to communication networks and security.

INTRODUCTION

Data is a fundamental resource for security professionals to perform forensic investigations, understanding systems' alerts, analyze users' behaviors and learn about vulnerabilities and misconfigurations of the deployed environment. Sharing of data is important and calls the attention of governmental, industrial organizations and research institutions. The importance of data sharing is comprehended and agreed by all involved parties. For instance, the Department of Homeland Security in the U.S. established an Information Sharing and Analysis Centers, to store and manage information about security threats. Moreover, many supercomputing centers confirmed examples of planned attacks against systems and organizations that do not have good mechanisms for data sharing. Furthermore, the industrial field has investments dedicated to installing and deploying different types of infrastructure equipment that are devoted only to data sharing purposes.

Although there exist efforts towards realizing data sharing, data sharing is currently not widespread. A reason behind this reluctance is related to the data owner's concerns about data abuse and the existing interest-gap between the data processors and the data owners. Data owners have more interest in trying to enforce their privacy requirements while potentially disregarding the processors' requirements. In many cases they do not have the motivation to understand the data use-case. On the other hand, data processors focus more on the usage of the data, and, in some cases, they may completely disregard the owners' requirements (e.g. if they are not privacy experts and they do not understand how to achieve the owners' requirements). As a result, data owners may simply decide not to share their data, or the data become useless for analysis after anonymization from processors' point of view.

This problem is worsened by the fact that existing anonymization tools can be inflexible as they do not allow for case-by-case anonymization settings/preferences based on the intended usage of the shared data and the trust-level of the entity that is requesting access to it. Also, data processors generally do not have any role to play in the anonymization process. Thus, they are not able to reflect their requirements nor object if the anonymization process sacrifices too much from the data utility, even though there should exist some other anonymization methods that meet the needs of both the owner and the processor. Conventional tools can be considered as ready-made and one-size-fits-all tools. There have been no recent efforts put to systematically integrate and evaluate existing methods together.

At the same time, the advent of privacy protection laws hardens this issue more than ever. The data controller is accountable for any privacy breach of data after sharing it with a third-party processor. For example, the European General Data Protection Laws (GDPR) mandate providers' accountability and forces them to demonstrate their responsibilities in preserving user's privacy. Quoting from the GDPR article 5; "data controller must define appropriate methods and measures for data protection and compliance by default and design". Article 28 "Where processing is to be carried out on behalf of a controller, the controller shall use only processors providing sufficient guarantees to implement appropriate technical and organizational measures in such a manner that processing will meet the requirements of this Regulation and ensure the protection of the rights of the data subject." Therefore, data owners have the responsibility of ensuring the protection of the data when outsourced to a third-party data processor.

Conventional anonymization tools can be categorized as cryptographic-based and replacement-based anonymization tools.

Cryptographic-Based Network Trace Anonymization Tools

Many of the existing network anonymization tools in this category (e.g., AnonTool, CANINE, CoralReef, FLAIM, tcpdpriv) use cryptographic-based anonymization methods such as prefix-preserving, hashing, truncation and permutation to anonymize the data. Those tools focus mainly on TCP dump data, anonymize the TCP header and network traces in the NetFlow, PCAP, TCPdump data format. They also support API/plugin interfaces to anonymize data on runtime. Moreover, most of those tools focus on the IP addresses fields in the data and ignore other fields (e.g. application port number) and the payload.

Replacement-Based Anonymization Tools

The existing tools in this category deal mainly with unstructured data. Those tools (e.g., Camouflage, Loganon, log-anon, NLM and bsmpseu) are mainly replacing the sensitive data attributes in the log with some values predefined by the user in what is called the rule file. This rule file contains patterns and used by the tool to perform pattern matching and stores the conversion state of the anonymization in a look-up table. Some other tools in this category use deterministic encryption and hashing algorithms to achieve this goal in case the conversion state/mapping is not important, and the analysis does not require remapping the anonymized data to its original state. These tools are not easy to use as they require from the data owner to know the patterns to search for and to manage the rules. Also, they are not flexible enough to tune parameters according to the various requirements.

SUMMARY

It is an object of the present disclosure to obviate or mitigate at least one disadvantage of the prior art.

There are provided systems and methods for anonymizing data.

In a first aspect of the present disclosure there is provided a method performed by a network node. The network node can comprise processing circuitry and a memory storing instructions executable by the processing circuitry and be configured to receive a data set comprising a plurality of data attributes each having an associated attribute type. The network node obtains privacy constraints associated with each of the data attributes; and determines a subset of available anonymization mechanisms for each data attribute in accordance with its associated privacy constraint and attribute type. The network node obtains utility requirements associated with one or more of the data attributes; and selects a respective anonymization mechanism for each of the plurality of data attributes from its corresponding subset in accordance with its associated utility requirement. The network node can then anonymize the data set by applying each selected anonymization mechanism to its corresponding data attribute.

In some embodiments, the network node can further pre-processing the data set to remove a first set of data attributes.

In some embodiments, the network node can further transmit the anonymized data set to a data processor node.

In some embodiments, the privacy constraints can be defined by a data owner for a given data processor. The privacy constraints can specify a level of information to be shared for each of the data attributes.

In some embodiments, the utility requirements can be defined by a data processor. The utility requirements can specify a level of information required by a data processor to use the anonymized data set.

In some embodiments, the step of selecting a respective anonymization mechanism for each of the plurality of data attributes can include selecting the anonymization mechanism having a maximum privacy level.

In some embodiments, the network node can generate an access control matrix by identifying all available anonymization mechanisms for each data attribute based on its attribute type. In some embodiments, the step of determining the subset of available anonymization mechanisms for each data attribute can include translating the privacy constraints into a permission mask in the access control matrix.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures, wherein.

DETAILED DESCRIPTION

Figure 1:
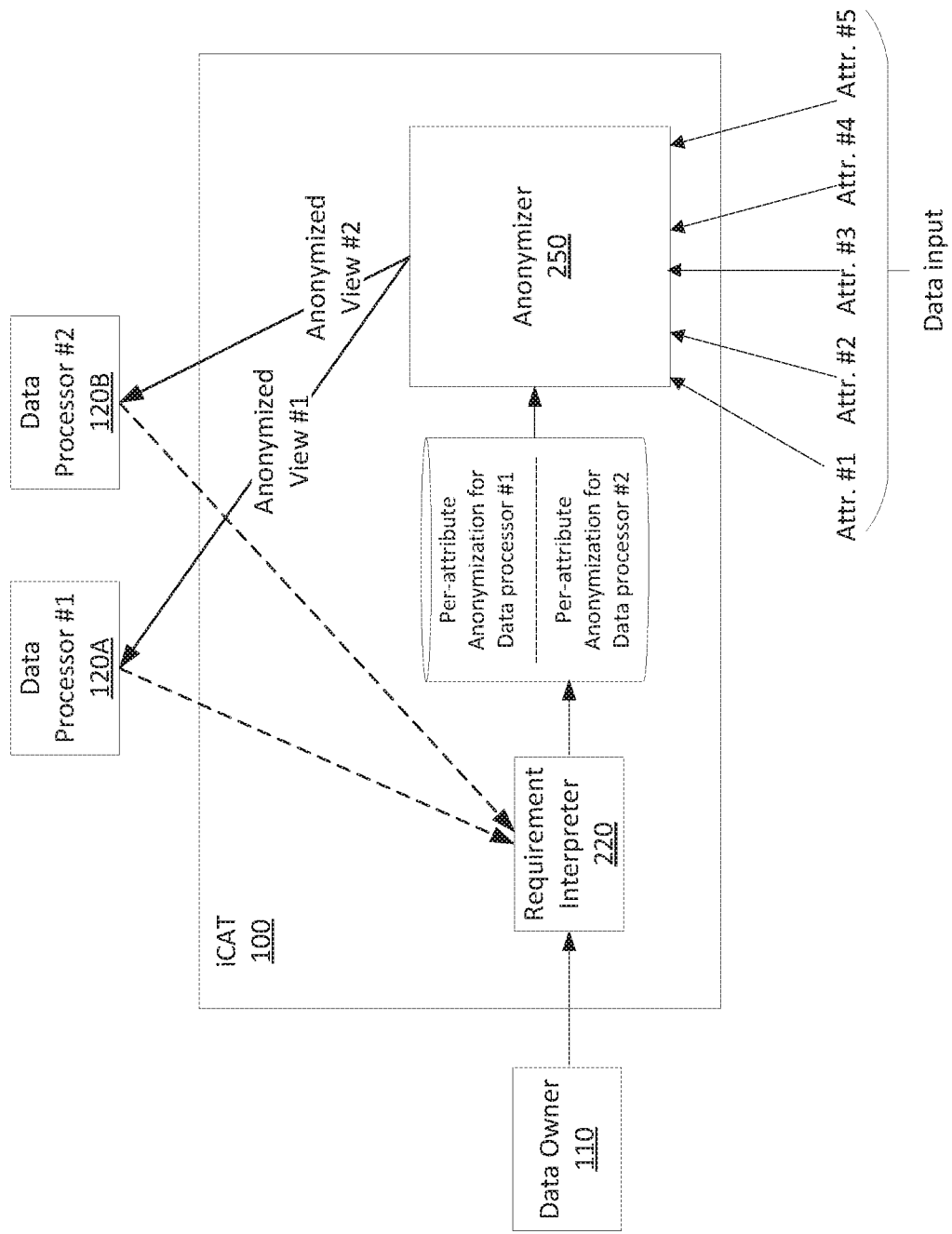
FIG. 1 illustrates an iCAT system overview.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "network node" is used and it can correspond to any type of radio access node (or radio network node) or any network node, which can communicate with a wireless device and/or with another network node in a cellular or mobile or wireless or wired communication system. Examples of network nodes are NodeB, MeNB, SeNB, a network node belonging to MCG or SCG, base station (BS), multi-standard radio (MSR) radio access node such as MSR BS, eNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, security node, etc. Example embodiments of a network node are described in more detail below with respect to FIG. 8.

In some embodiments, the term "radio access technology" (RAT) refers to any RAT e.g. UTRA, E-UTRA, narrow band internet of things (NB-IoT), WiFi, Bluetooth, next generation RAT (NR), 4G, 5G, etc. Any of the first and the second nodes may be capable of supporting a single or multiple RATs.

A common drawback among the existing data anonymization solutions is that each solution alone is weak and one-size-fits-all cases. The conventional solutions typically offer one anonymization level that either provides high privacy guarantees and sacrifice the data utility or provides high utility guarantees that render logs usable for auditing and analysis but at the price of data privacy. However, in the real-world, users have different needs and are trusted differently.

The existing solutions consider the data owner as the only user of the anonymization tool and the only participant in the anonymization process and ignore the data processor. However, the data processor will be the real user of the anonymized data and its requirements should be taken into consideration if not contradicting with the owner's privacy constraints.

There is a lack of flexible anonymization systems that allow for building different views of the same data that fits different usage scenarios from different data processor profiles with different levels of trust from the data owner. This can be possible according to the fact that different anonymization methods provide different privacy/utility output.

An anonymization tool should be able to create a bridge between data owners' requirements and data processors needs in a way that guarantees the privacy preserving of the data and usability assurance to meet the usage needs. It should also put into consideration that both parties' requirements may differ according to different factors (i.e., the identity of the data processor, type of data, desired data usage, etc.), and hence this tool should be able to adapt to those factors.

Some embodiments described herein will provide a user-based anonymization of data that provides different views of the same data with different anonymization-levels based on the trust-level of the data processor and the data usage scenario while ensuring the data owner privacy requirements.

Some embodiments include a system to enforce access of different end users to different views of the same data customized based on privacy/confidentiality constraints and utility-based requirements. The access to a given view can depend on the privacy/confidentiality requirements pre-defined by the data owner for the data, the level of trust in the data processor and/or the requirements of the latter in terms of data utility.

Such a solution can allow a data owner to control the amount of information about the data that is shared with different potential data processors based on their trust-levels and their data utility needs.

First, based on the input data and the available anonymization methods that can be used to anonymize different fields/attribute types in the input data, the system can define an anonymization space where a single point in this space defines a possible view of the same input data. Based on this anonymization space, an access control matrix is generated where different roles are assigned with different levels of anonymization (e.g. privacy and utility levels) for each data attribute.

Second, a data owner can express privacy constraints for a given data processor. The system interprets those requirements and use them to define a single role in the access control matrix. This role, in turn is mapped into a permission mask that defines a sub-part of the anonymization space granted to that data processor.

Third, once the data processor is granted a certain permission of anonymization levels, utility-related requirements can be input specifying the needed data attributes, their respective level of utility, and/or the usage scenario for the anonymized data.

Based on these requirements, the system can build an appropriate combination of the anonymization methods from the anonymization methods sub-space that the user/data processor can have access to according to the privacy constraints of the data owner.

Finally, the data processor can access a view of anonymized input data that meets both data owner privacy/confidentiality constraints and data processor requirements.

An interactive customizable anonymization tool, referred to as "iCAT" herein, will be described that enforces access of different end users to different views of the same data customized based on privacy/confidentiality constraints and utility-based requirements. FIG. 1 illustrates an overview of an example iCAT system 100. The access to a given view can depend on the privacy/confidentiality requirements pre-defined by the data owner 110 for the data depending on the level of trust in the data processor. These privacy constraints can define a subset of the anonymization methods for each attribute that each of the one or more data processor(s) 120 can access. Once the latter is granted access, the data processors 120A, 120B can specify requirements in terms of data utility and iCAT 100 can build the combination of anonymization methods from the allowed ones that serve the defined purpose. Then, the corresponding view(s) of the anonymized data is provided to the data processor(s) 120.

Figure 2:
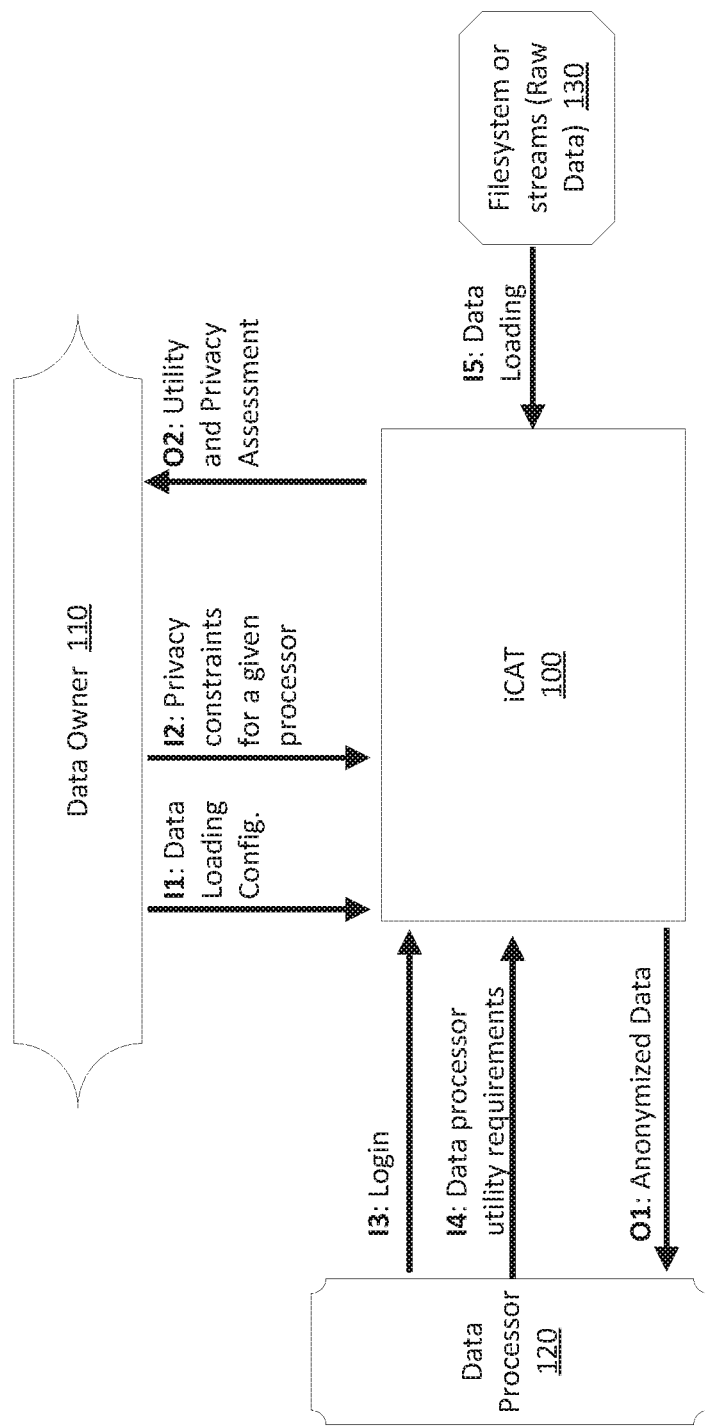
FIG. 2 illustrates an example of iCAT system interactions.

FIG. 2 illustrates an example of interactions between the data owner 110 and a data processor 120 with iCAT 100.

The data owner interacts 110 with iCAT 100 as follows:
Input I1: The data owner 110 configures the loading of the data intended to be shared after anonymization. The rules are set for preprocessing the data.
Input I2: For each data processor 120 requesting access to the data, the data owner 110, based on the processor's trust-level, can express privacy/confidentiality constraints over the data (e.g. each attribute in the data) by specifying the level of information that is provided access to in each attribute. iCAT 100 generates a role for the data processor 120 resulting from the processing of the privacy/confidentiality constraints defined by the data owner 110. This role represents the level of trust for the data processor 120, that is associated with each identity.
Output O2: The data owner 110 can receive a report(s) assessing the utility and privacy levels in the anonymized data.

The data processor 120 requesting access to the anonymized data interacts with iCAT 100 as follows:
Input I3: The data processor 120 authenticates with iCAT 100 using credentials (not detailed here) that are associated with the role granted by the data owner 110.
Input I4: The data processor 120 expresses the needed usage of the data and the requested utility levels for each attribute of the data. Once the data processor 120 requirements are processed and the corresponding customized anonymization methods are granted, the requested data file/stream (I5) are fetched by iCAT 100 and anonymized, accordingly.
Output O1: The data processor 120 receives the anonymized data set from iCAT 100.

It is noted that I1, I2, I3, I4 are interactions that may need to happen only one time before a new data processor begins to receive anonymized data. I2, O1, I3, and I4 can occur as many times as the number of data processors. It is noted that the input data set (I5) can be retrieved from file system/storage 130 that may or not be controlled by the data owner 110.

Figure 3A:
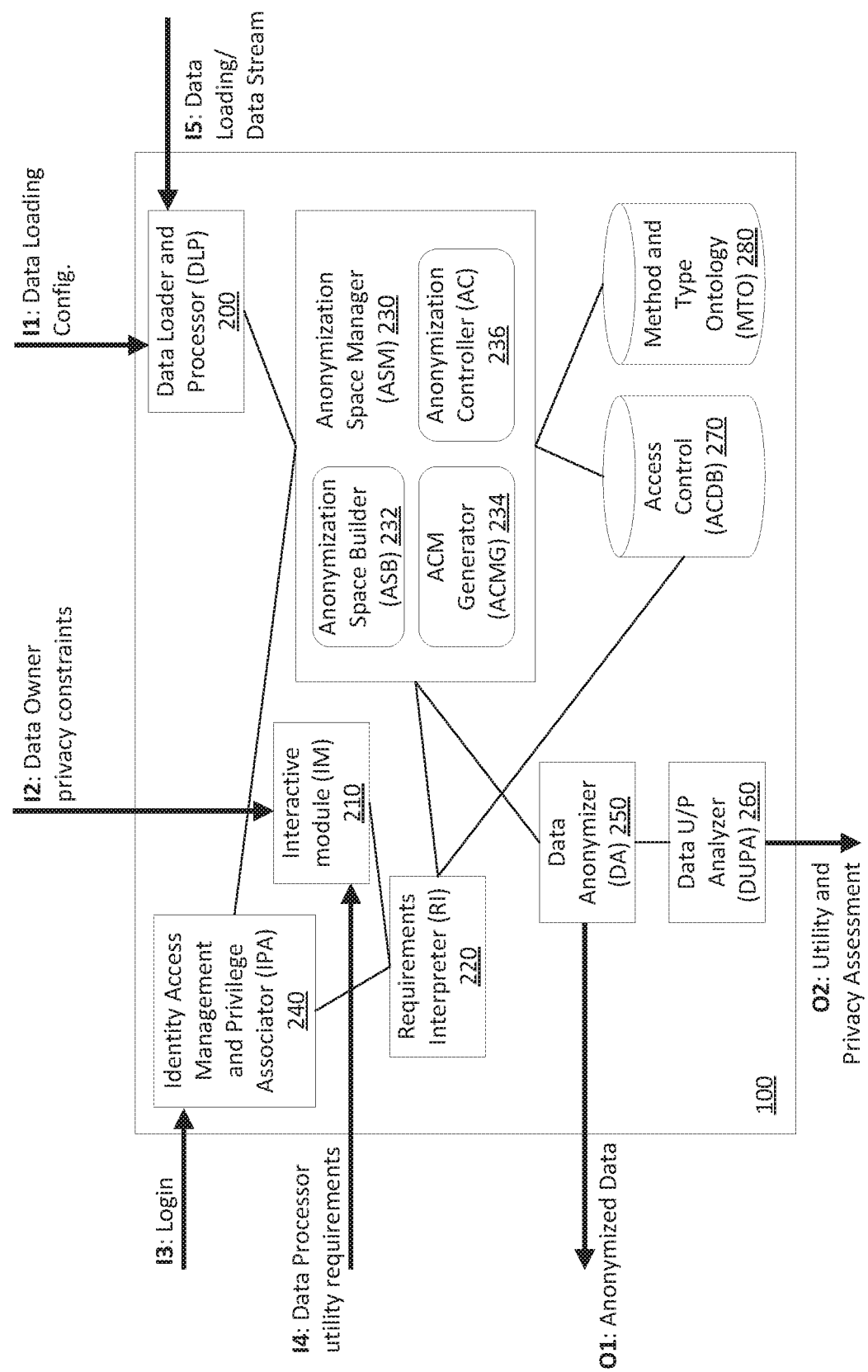
FIG. 3a is an example iCAT architecture.
Figure 3B:
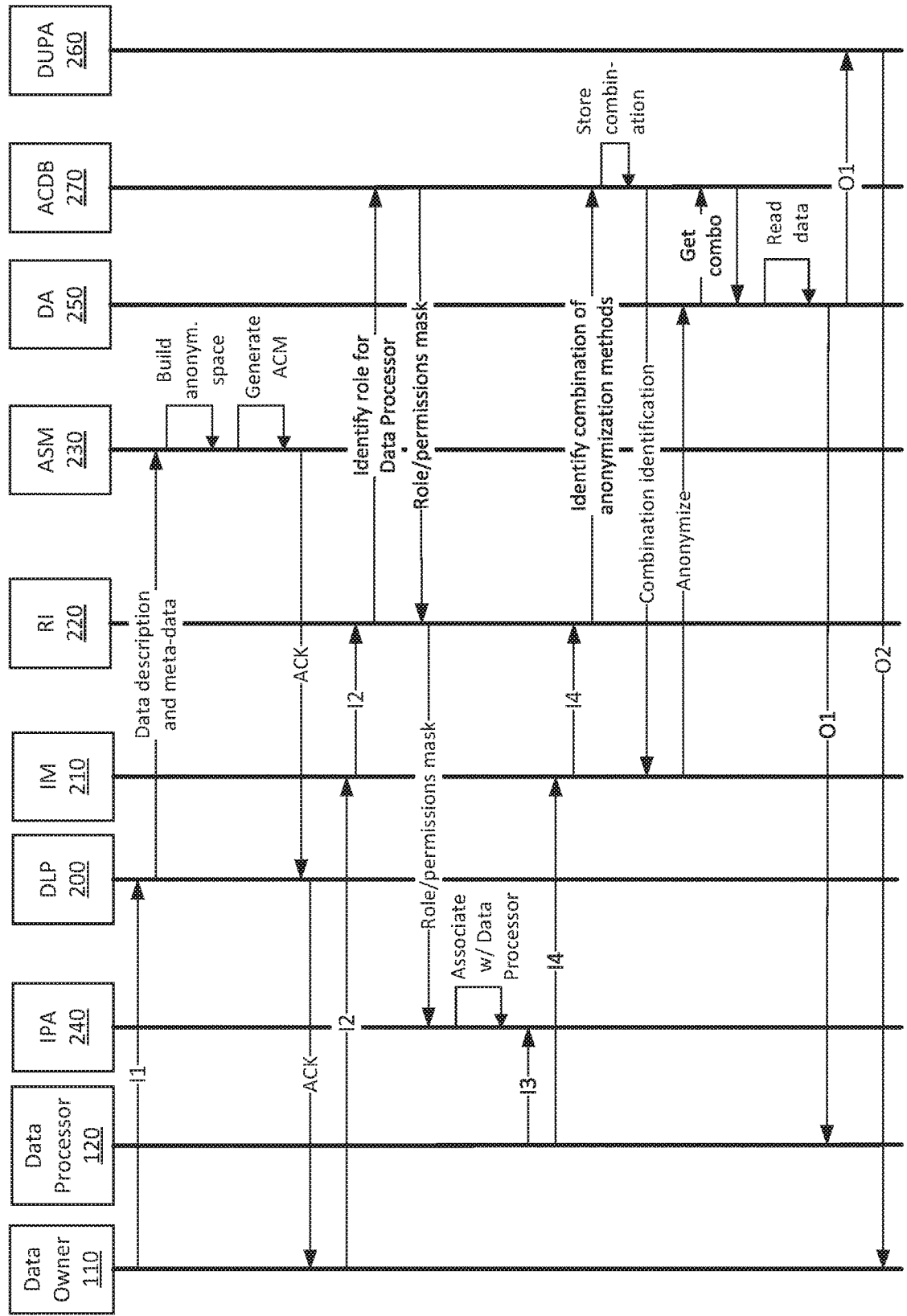
FIG. 3b is a sequence diagram illustrating the interactions between iCAT components.

FIG. 3a illustrates an example architecture of the iCAT system 100. FIG. 3b is a sequence diagram further illustrating the interactions between the components for illustrative purposes. Those skilled in the art will appreciate that the modules can be varied, combined and/or omitted in certain embodiments.

Data Loader and Processor (DLP) 200: This module is responsible for the configuration the data source from where the data is fetched (e.g. from a filesystem or a database, a data stream) (I1) and the loading of the actual data to be anonymized (I5) by iCAT 100. DLP 200 also allows the data owner to specify/perform a set of pre-processing operations (e.g. filtering, cleansing, sorting) on the data before making it available for sharing.

Interactive Module (IM) 210: This module mainly interacts with the data processor and the data owner to gather their requirements. The IM module 210 could be a GUI, a command-line, or an API. It receives as inputs the privacy/confidentiality requirements (I2) and the utility requirements (I4) from the data owner and the data processor, respectively. These requirements can be specified either as natural language statements or written in a computer (specification) language. These requirements could be either entered manually (e.g. human interaction) by the data owner and controller or could be stored in a file, or a database, or sent through API calls. The IM module 210 feeds these requirements to the Requirements Interpreter (RI) module 220. Example of a requirement from the data owner (I2) Req-1="Only share the subnet information of the IP addresses". Example of a requirement from the data processor (I4) Req-2="All anonymized IP addresses preserves the topology of the network".

Requirements Interpreter (RI) 220: This module is mainly responsible for translating the requirements from the data owner and data processor, received from IM module 210, into the appropriate anonymization methods for the requested data attributes.

The data owner privacy/confidentiality requirements specified for a given data processor are translated into a specific role in the Access Control Matrix (ACM) (e.g. a privacy/utility ACM built for anonymization privacy/utility access constraints) for a given data processor. The role is associated to a subset of the anonymization space that comply with privacy constraints and can be accessed by a given data processor.

The data processor requirements are translated into the appropriate combination of the anonymization methods for all attributes. This combination can be stored in the Access Control database 270, in table processor-anonymization.

In the case of requirements specified in natural language, RI 220 can use the Stanford CoreNLP and then Part-Of-Speech (POS) Tagger tool to translate each requirement into the corresponding anonymization method requirements. The Natural language processing can access the Method and Type Ontology (MTO) database 280 that stores ontologies in order to correctly translate those requirements. For iCAT 100 to serve online anonymized data, these requirements from data owner and data processor can be provided one time at the initiation phase, as a pre-setting of required privacy and utility requirements.

Anonymization Space Manager (ASM) 230: This module is mainly responsible for (1) building the anonymization space and generating the Access Control Matrix (ACM) for the loaded data; and (2) providing access to the appropriate anonymization sub-space (anonymization methods for each data attribute) by the Data Anonymizer (DA) module 250. ASM 230 can consist of additional submodules.

Anonymization Space Builder (ASB) 232: This sub-module automatically calculates the entire anonymization space, which consists of all available combination of anonymization methods for each data attribute based on its type. The resulted anonymization-space lattice will be stored as a table in the Access Control database 270, such as a space table.

ACM Generator (ACMG) 234: This sub-module is mainly responsible for creating an Access Control Matrix based on the anonymization space obtained from the ASB module 232. This module then defines different roles that have different permissions to different anonymization methods for each data attribute. Each role (a record in ACM) is then assigned a privilege mask in the anonymization space table. The resulting ACM and privilege masks will be stored in another table in the Access Control database 270, such as the ACM table.

Anonymization Controller (AC) 236: This sub-module is mainly responsible for controlling the anonymization process by granting DA 250 access to only the combination of anonymization methods associated with the data processor and his utility scenario. Then, the user will receive the anonymized data view, which consists of data records, where each data attribute is anonymized using the anonymization method selected for it.

Identity Access Management and Privilege Associator (IPA) 240: This module is mainly responsible for granting a permission mask to a data processor role in the ACM table. This mask determines the list of the anonymization methods that are available for the data processor based on his/her role for each attribute. This will be stored in a table associating a user identity to the permission mask.

Data Anonymizer (DA) 250: This module is mainly responsible for anonymizing each data attribute with the corresponding anonymization method that meets the requirements from the data owner and the data processor. The anonymized data is forwarded to the data processor.

Data Utility/Privacy Analyzer (DUPA) 260: This module provides data utility and privacy analysis after anonymization. The analysis is based on different methods (i.e., precision, height, discernibility and non-uniform entropy). The analysis phase is responsible for evaluating and measuring the suitability in terms of data privacy and utility. This is done by comparing anonymized data to the original plain input using different measures. Based on this analysis results, the selected anonymization solution might be updated, and another anonymization configuration can be selected from the available space.

Anonymization Space Building Using Lattices

In some embodiments, iCAT can build the anonymization space as a lattice, where each combination of the available anonymization methods is a point in that space. iCAT translates the requirements from the data owner into a subpart of this space and the data processor into a single point in that sub-space.

Figure 4:
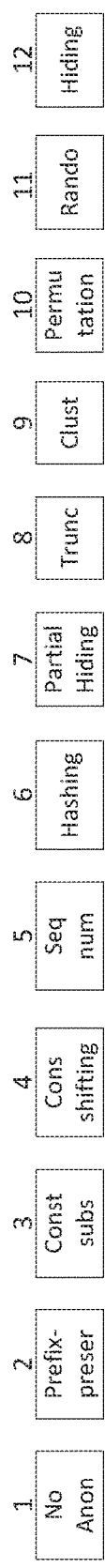
FIG. 4 illustrates example anonymization methods.
Figure 4:
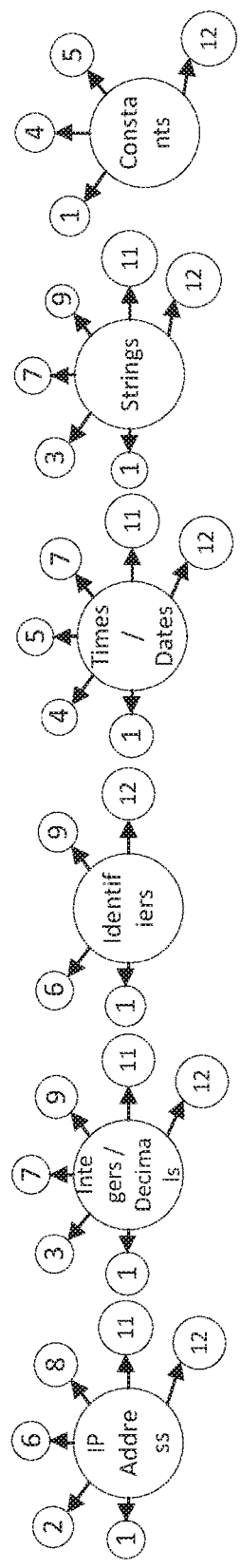
Figure 4:
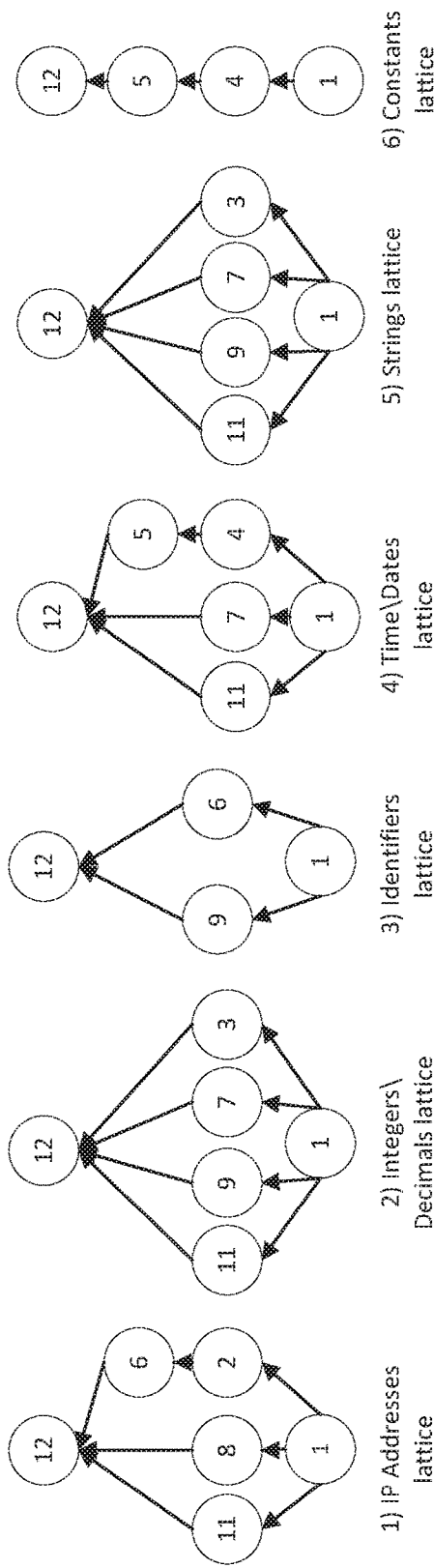

First, a unique identifier is assigned to each anonymization method, as shown in FIG. 4a. A non-limiting list of anonymization methods/mechanisms includes: No Anonymization, Prefix-Preserving, Constant substitution, Constant shifting, Sequence numbering, Hashing, Partial hiding, Truncation, Clustering, Permutation, Randomization, and Hiding. For each type of data (network data, access control logs), different attributes, categorized according to their attribute type, may exist. For example, for network data, there are six example attributes types: IP addresses, Integers/Decimals, Identifiers, Time/Dates, Strings, Constants. Then, each attribute type is associated with the identifiers of the anonymization methods that may apply to it, as shown in FIG. 4b.

Since each anonymization method has its own level of privacy/utility, lattice theory can be used to model, for each attribute type, the level of privacy and utility of the applicable anonymization methods. The lattices must satisfy the following properties:

Each lattices method (node in the graph) has its own level of privacy/utility.

The parent method has strictly less utility/higher privacy than the child method.

The partial order relation is the variation in privacy/utility level that each method offers.

The least upper bound of the lattice is no-anonymization and greatest lower bound is hiding.

FIG. 4c shows a lattice per attribute type (attribute lattices) that satisfies the pre-defined properties.

The final anonymization space is built based on a cross-product of the attribute lattices together for different attributes in the data. The final product is a large anonymization lattice of size S, such that:

$$S = \Pi_{n=1}^{L} N_n;$$

Where L is the number of attribute lattices and N is the number of nodes per lattice Access Control Matrix Generation In some embodiments, security tags are assigned in the lattice that range from the most sensitive (i.e. top of the lattice), down to the least sensitive (i.e. bottom of lattice). The data owner requirements are used to assign a trust-level to each data processor based on the predefined privacy constraints and regulations, which will determine the anonymization methods that are granted to this processor based on the requirements, as follows:

Privacy-up: data processor can select from all anonymization methods that are at or above a given privacy requirements.

Utility-down: data processor can select from all anonymization methods that are at or below a given utility requirement.

Based on this example model, the data owner will have the capability to assign a privacy level to the data processor on each attribute based on privacy requirements. This level can determine the anonymization methods granted to a data processor. Moreover, the iCAT system and/or the data processor will be able to select between different anonymization methods that meet the utility requirements and the use-case of the data. However, the available anonymization methods will be assigned based on the privacy-up and utility-down rules.

For example, if the data processor is more interested in the utility IP addresses than other attributes in the data, then, the data owner can grant to this data processor access to an anonymization approach that have high utility-level and a relatively low privacy level for the IP address attribute (e.g., the prefix-preserving anonymization method). Thus, the data processor can select between all other anonymization methods that are available for this attribute that have same or less-utility level than prefix-preserving method. However, for other data attributes, the privacy level will be kept high. Thus, the data processor will not be able to select anonymization method less than the assigned privacy level. Consequently, the access that will be granted to this user will be the union of the privacy-up and utility-down levels assigned to each data attribute based on both parties' requirements.

As a result, the anonymization process can depend on the privacy/utility level in conjunction with the anonymization method that applies to the data attribute. Whereas, each dimension from the lattice reflects different utility/privacy levels and one of those dimensions will satisfy both data owners and processors needs.

Access Control Matrix Generation

Access Control Matrix (ACM) is used to describe the rights of a subject with respect to every object in the system and envisioned as a rectangular array of cells, with one row per subject and one column per object. Such that, if O is a set of objects and S is a set subjects, then, there exists a set of rights R of the form R(s, o), where s∈S, o∈O and r(s, o)⊆R. Access Control Matrix indicates the access mode that the subject is permitted to exercise on the object. Each column is equivalent to an access control list for the object; and each row is equivalent to an access profile for the subject.

Using the anonymization space lattice, an ACM can be generated, as shown in Table 1, where each row represents a role and/or user profile that can be associated to a given data processor, that defines the set of anonymization methods that can be applied on each data attribute to be shared with that data processor.

TABLE 1

ACM generated based on anonymizing space lattice

| | Attr. #1 (Type Constants) | Attr. #2 (Type: Identities) | Attr. #3 (Type: Time/date) | Attr. #4 (Type Int/Dec) | Attr. #5 (Type String) | Attr. #6 (Type IP) | Permission Mask |
|---|---|---|---|---|---|---|---|
| Role-1 | No-Anon | No-Anon | No-Anon | No-Anon | No-Anon | No-Anon | 33 55 55 |
| Role-2 | No-Anon | No-Anon | No-Anon | No-Anon | No-Anon | Pref-Pres | 33 55 54 |
| Role-3 | No-Anon | No-Anon | No-Anon | No-Anon | No-Anon | Trunc | 33 55 53 |
| ... | ... | ... | ... | ... | ... | ... | ... |
| Role-N | Hiding | Hiding | Hiding | Hiding | Hiding | Hiding | 00 00 00 |

This example shows different data processor' profiles and use-cases that represent different dimensions from the anonymization-space lattice:

Legal interception user: This user needs to have access to the data without anonymization. As the trust level is high, the data owner needs to provide him with the permission 33 55 55 in Table 1 corresponding to Role-1.

Root user: This user is assigned with a role grating him access to data in order to audit/handle the system in emergency cases and high threat security alerts. In Table 1, root user is assigned Role-1 with the permission 33 55 55. Thus, he has access to all data and with all privacy/utility levels starting from no anonymization to hiding Internal Security Information and Event Management (SIEM) user: This user is assigned with the anonymization methods that allows him to perform statistical operations and identify deviation from norm and act accordingly, SIEM has access to highly usable anonymization data that preserves the statistical relations but do not have access to the non-anonymized data.

Managed Security Service Providers (MSSP) user: This privilege is assigned to users who are independent of the organization they are performing security analysis on behalf of the data owner. Usually, this user has access to data with certain level of utility however falls within higher privacy requirements than internal SIEM.

Each role in the access control matrix can be mapped into a permission mask, as shown in the last column of Table 1. Data owner privacy rules and regulations are translated into one mask in order to determine the data processor privileges in terms of the privacy/utility level which they are granted.

Permission Mask Generation

Permission masks are generated based on the lattices. As each attribute lattice models the anonymization methods that apply to that attribute type, an identifier can be associated with each method, while always assigning 0 to the greatest lower bound node (which is hiding in all cases). Table 2 provides an example of identifier assignment for the data type Time/date:

TABLE 2

Example permission masks

| | |
|---|---|
| Hiding | 0 |
| Sequence Number | 1 |
| Constant shifting | 2 |
| Partial hiding | 3 |
| Randomization | 4 |
| No anonymization | 5 |

Depending on the number of attributes to be anonymized and their types, the permission mask can be built such that the length will be the number of attributes and the value on each record of Table 1 will be the concatenation of different identifiers of the anonymization methods in the same order than the attributes (columns). Thus, each permission mask will be associated with a role in the ACM.

Requirements Translation

As mentioned earlier, one goal is to map the data processors and controllers' requirements to one dimension from the anonymization lattice, which reflects a certain desired level of privacy and utility that satisfy both entities' needs. Those requirements can be expressed by data owner and data processor either in natural language statements (requiring natural language processing) or in computer language. In the following section, the option where the requirements are expressed in natural language will be described. The examples will be provided for English as the selected natural language.

Those requirements describe the use-case and trust-level based on which the appropriate combination of anonymization methods is built, if translated properly. However, understanding those requirements and mapping them to the appropriate anonymization methods is challenging and not straightforward due to the following reasons:

Data owner and processors explain and demonstrate their requirements based on their knowledge and understanding from different perspectives and based on different understanding.

Data processors won't be able to verify if the anonymized data meets their requirements unless the anonymization process is done and the anonymized data is received.

To solve these issues, the proposed system intercepts the human natural language and provides multiple possible interpretations for each vague word based on query processing. Similarly, the system can interactively communicate with the user as the following:

NLP is used to process, filter and interpret data owner and data processor requirements expressed as English statements.

The straight-forward requirements are translated to the appropriate attribute type and anonymization method using ontology modeling.

For each ambiguous requirement, a user can choose between multiple interpretations in order to solve the ambiguity.

Natural Language Processing (NLP)

In one embodiment, the Stanford Parser CoreNLP is used, which provides a set of human language technology processing tools, for this purpose. Initially, CoreNLP separates the English language statements entered by both parties into different sentences. Because CoreNLP is strongly capable to extract particular or open-class relations between entity mentions, it will be assumed that each detected sentence represents one requirement.

Next, the Part-Of-Speech Tagger (POS Tagger) tool from CoreNLP is used, to filter and prepare the requirements for the ontology modeling as will be discussed in the following section. The POS tagger returns the sentences words as a pair of tokens and its part of speech tag, which describes the type of the word from a linguistic point of view (i.e., noun, verb, adjective). After the POS tagger assigns a tag for each requirement, the unrelated words (i.e., pronouns, symbols, adverbs, etc.) are filtered from each requirement. This filtering process can reduce the requirements mapping time.

Figure 5:
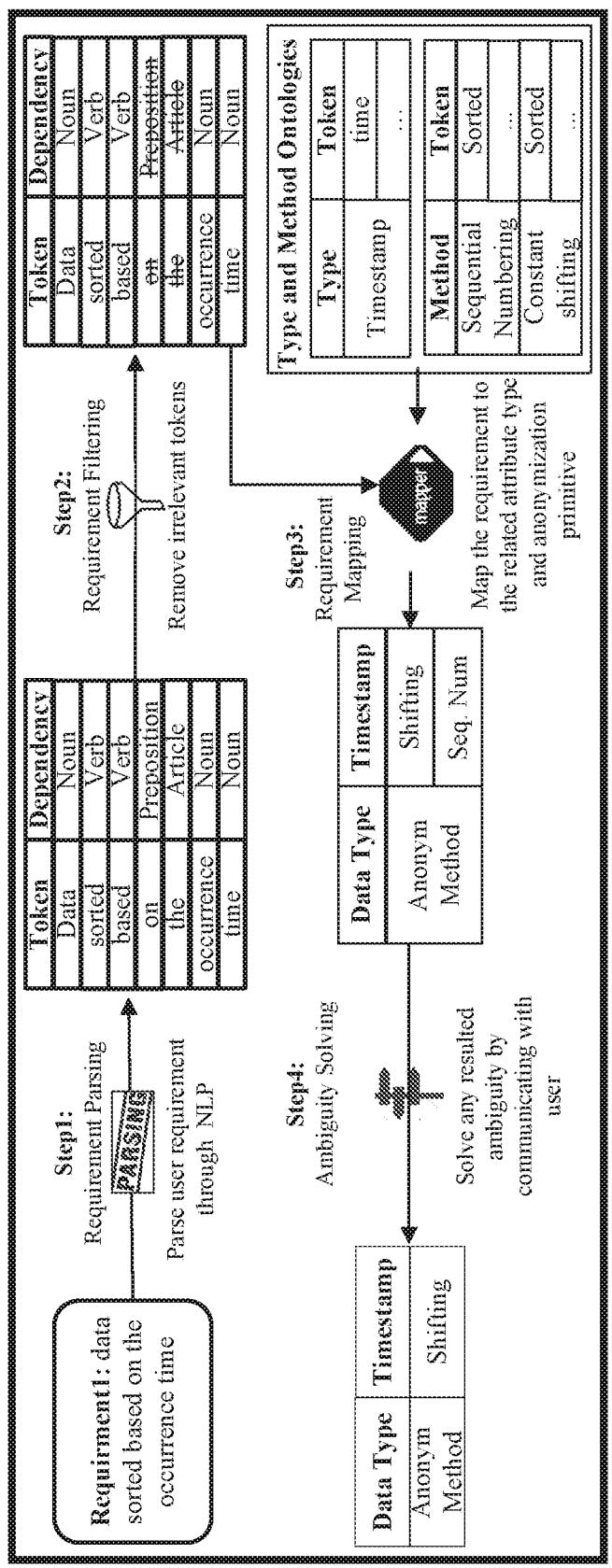
FIG. 5 illustrates an example requirement translation process.

FIG. 5 illustrates an overview of the requirement translation process. FIG. 5 illustrates an example user requirement, Requirement1: "The logged records are sorted based on their Time of occurrence", being annotated using the Stanford the POS tagger from CoreNLP and the filtering step.

Ontology Modeling

Ontology modeling is the process of capturing information or knowledge as a model that can be used by users to capture relationships and answer complex questions. Ontology made up from concepts and relationships, which are used to describe the system instances and their relationships. Ontology modeling can be used to define the relationship between data owner and data processor requirements at one side and their corresponding data attribute and anonymization methods on the other side, as the following:

Ontology Learning: The concepts for data owner and data processor are defined as: i) anony-methods; ii) method-func; iii) attribute-types; iv) attribute-synon. Based on this definition, the instances of the anony-methods are the 12 anonymization methods pre-defined and the method-func instances are manually created based on the functionality and unique properties that each anonymization method can achieve. Moreover, the instances of the attribute-type concept are the 6 attribute types which are predefined and the attribute-synon instances are manually created based on the use/synonymous of each attribute type.

Figure 6:
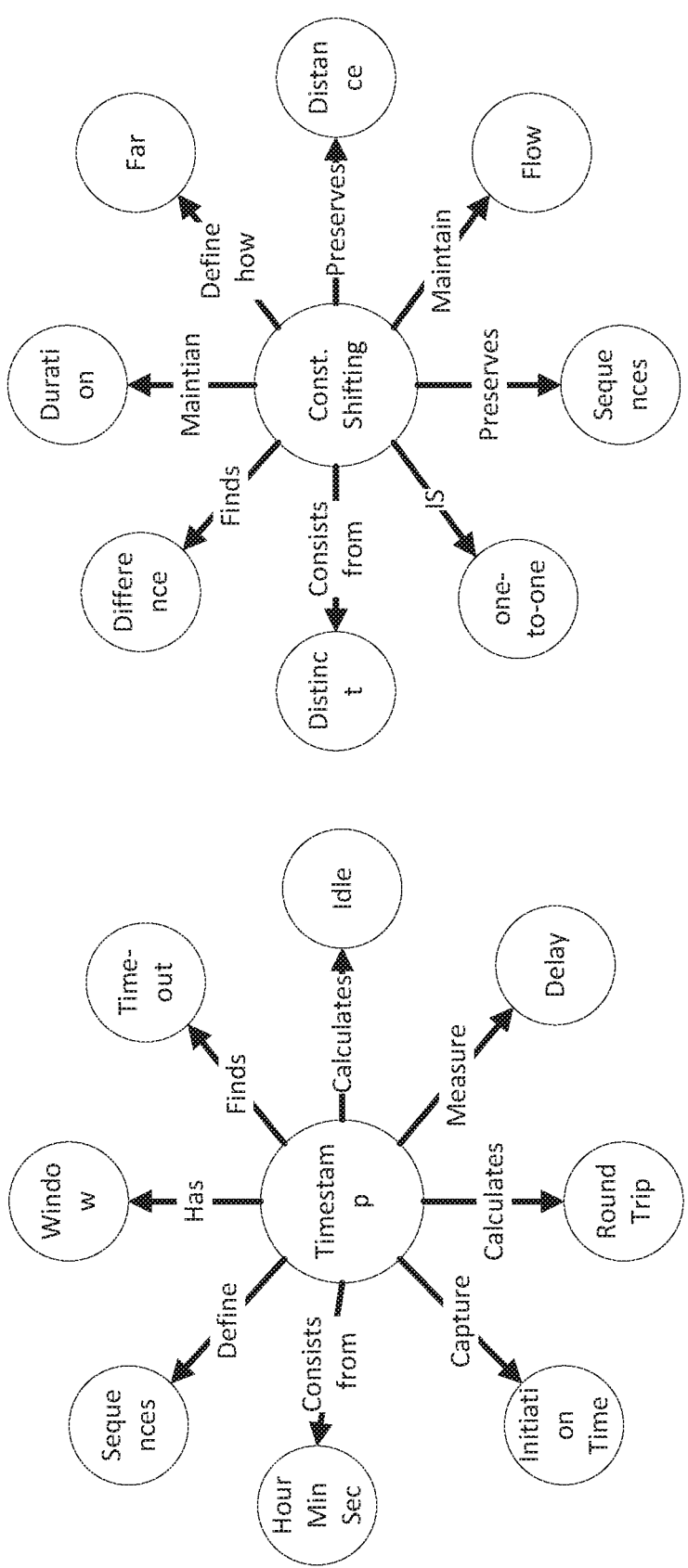
FIG. 6 illustrates examples of ontology modeling.

Next, the relationships between those concept instances are found by defining relations between the anony-methods and the method-func concepts. Also, by defining relations between the attribute-types and the attribute-synon instances. For example, FIG. 6 shows the type-ontologies related to the timestamp attribute type and the method-ontology related to the constant shifting anonymization method. Next, the resulting ontologies are stored into two separate tables, namely the type-ontology and the method-ontology.

Being at the top of the type and method ontologies tables will allow iCAT from capturing the relationship between the words of the user requirements and translate them into the appropriate data attribute type and anonymization methods. The details of this translation operation are described as follows.

Requirements Mapping: The requirements mapper is responsible for mapping the processed and filtered requirements from the NLP with the learned ontologies in order to find the data attribute type and the anonymization method corresponding to the intercepted user requirement. This is done by matching every tokenized word in the processed requirement with the type and method ontologies tables as shown in FIG. 6. FIG. 6 illustrates ontologies of timestamp and constant substitution. The matching process occurs as the following:

For each tokenized word in each annotated requirement, the tokenized word will be matched first with the type ontology table and then with the type ontology.

If the tokenized words are mapped to only one record from the type ontology table and one record from the method ontology table, then the requirement is translated properly, and the mapper will jump to the second requirement.

If none of the tokenized words are matching any record in both type and method ontologies tables, then the word will be dropped from the sentence annotations table.

If the mapper fails to map user tokenized words with any record from the type and/or method ontologies or if the tokenized words have multiple matchings. Then, the mapper will return an error message to the user reporting this issue and forward this conflict to the Ambiguity Solver in order to solve it with the user through the GUI as will be discussed in the following section.

Ambiguity Solver

In the case where the requirement mapper misunderstand/failed to map the user's requirements, the ambiguity solver can interactively communicate with the user to illustrate how the requirement intercepted and to return multiple interpretations for the user to choose from. For example, if the user requirement is mapped to multiple anonymization methods, both anonymization methods are reported to the user through the GUI and they can select between them based on the requirements/needs. This interactive communication with the user can achieve adequate reliability without overburdening the user in following some rules/specifications for writing requirements.

Figure 7:
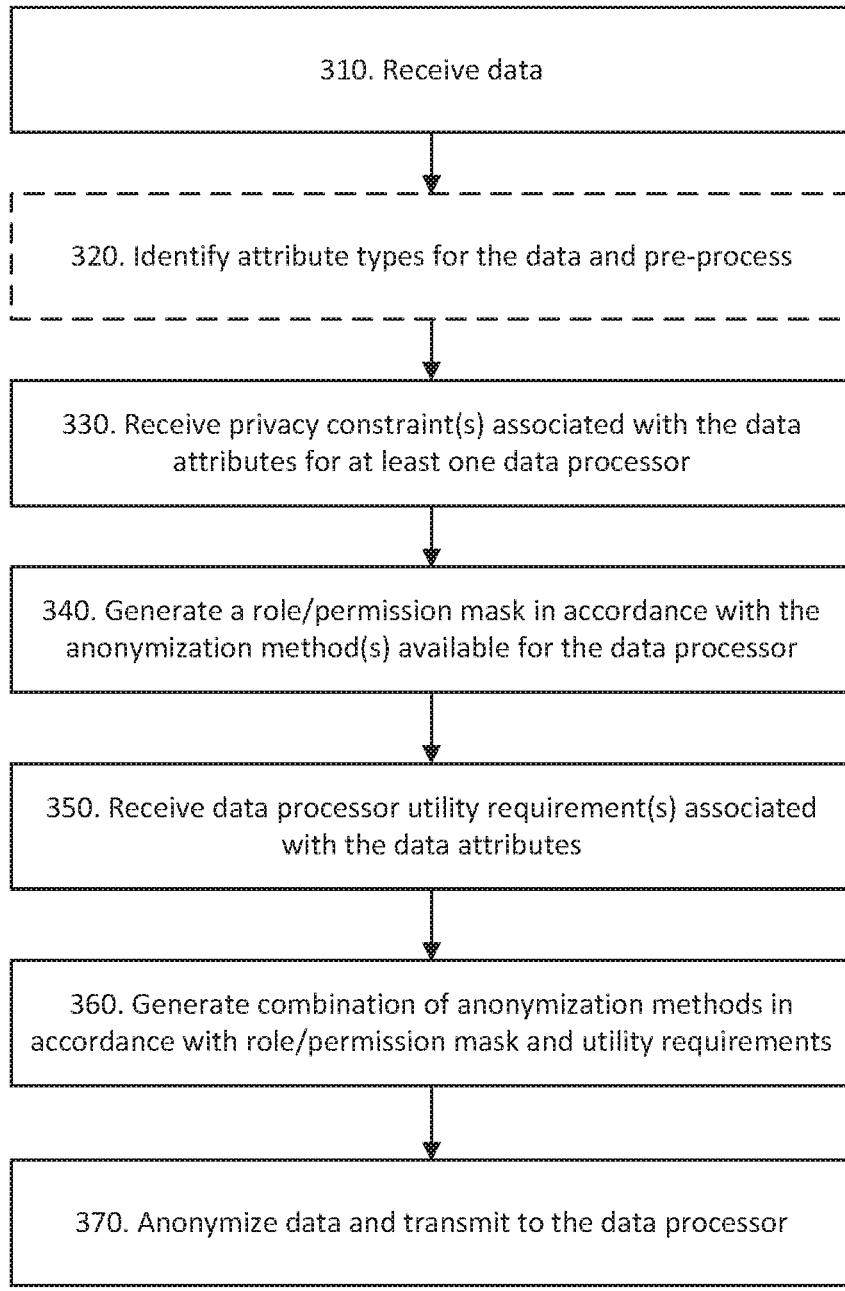
FIG. 7 is a flow chart illustrating a method which can be performed in a network node.

FIG. 7 is a flow chart illustrating a method which can be performed in a network node. The network node can include the functionality of the iCAT system 100 as described herein.

Step 310: Receive data set. The data owner can load the data file into iCAT or configure the source of the data into the data loader interface of iCAT. The data set comprises a plurality of data attributes each having an associated attribute type (e.g. IP addresses, Integers/Decimals, Identifiers, Time/Dates, Strings, Constants, etc. as have been described for network data).

Step 320: iCAT identifies the attributes types and generates the access control matrix for the data. The data owner can optionally configure the tool to pre-process the raw data to sanitize and remove/hide some attributes if required.

Step 330: Receive privacy constraints associated with each of the data attributes. The data owner can input the privacy/confidentiality constraints with respect to one or more data processors that the anonymized data will be shared with. These constraints can be expressed for each attribute in the data.

Step 340: Determining a first subset of available anonymization mechanisms for each data attribute in accordance with its associated privacy constraint and attribute type. iCAT interprets the data owner's privacy constraints and translates them into a sub-space from the available anonymization space. This translation results in a role/permission mask specified by the pre-built access control matrix that restricts the number of anonymization methods available to the specific data processor for each requested data attribute.

Step 350: Receive utility requirements associated with one or more of the data attributes. In some embodiments, the data processor is provided with an account with the access permission mask that the data owner has granted. The data processor can then input requirements specifying the needed data attributes, their respective level of utility, and the usage scenario for the anonymized data and input them to iCAT.

Step 360: Generate combination of appropriate anonymization method(s) for each data attribute. Based on the utility requirements, iCAT builds the combination of anonymization method(s) from the anonymization sub-space (e.g. the role/permission mask) that fit the data processor needs. iCAT can then select a respective anonymization mechanism for each of the plurality of data attributes from its corresponding subset. In some embodiments, the anonymization mechanism having the maximum privacy level can be selected from the group of anonymization mechanisms that satisfy the utility requirement(s).

Step 370: iCAT anonymizes the data set by applying each respective selected anonymization mechanism to its corresponding data attribute. iCAT can then provide the anonymized data set to the data processor.

It will be appreciated that one or more of the above steps can be performed simultaneously and/or in a different order. Also, steps illustrated in dashed lines are optional and can be omitted in some embodiments.

Some embodiments provide a system that provides each data processor (e.g. user) with a specific anonymized view(s) of the data. This specific anonymized view can be built for the data processor based on its granted role and specific privacy needs for the data by the data owner. The different combinations of anonymization methods, depending on the role granted to them by the access control mechanism are used in the specific view. Therefore, the view is built as to present anonymized data to the data processor, those data being anonymized as a combination of data owner privacy needs, data processor utility needs and capabilities of different set of anonymization methods.

Additionally, in some embodiments, the view defines a fine-grained anonymization method for different attributes. Different data attributes can be anonymized in the view based on the data owner privacy needs and data processor utility needs for each attribute and according to the capabilities of different anonymization methods for each attribute type.

Accordingly, an access control mechanism presenting different anonymization views at attribute-level granularity based on data owner privacy needs, data processor utility needs, and anonymization methods capabilities can be configured. The configuration can be on a per data attribute basis, based on the trust-level of the data processor and the privacy/confidentiality constraints of the data owner.

The system described herein can bridge the gap between the data owner's privacy constraints and the data processor's requirements by providing a flexible platform that automatically translates both parties needs to the appropriate anonymization methods that satisfy both parties. It is not expected that either the data owner or the data processor will have prior knowledge about which anonymization methods best meet their requirements, they can specify only the level of privacy (from the data owner) and the level of utility (from the data processor). This allows both parties to gather their requirements and interpret them to find the appropriate anonymization method, customized for their needs.

The system described herein can be used as an intermediate system between any logging-as-a-service system and various log consumer systems that have different trust-levels and requires different processing use case for the data. The data owner can set in advance the required privacy-level, the log consumer can query the tool in an interactive manner without any intervention from the data owner to get anonymized view of the data that meet the requirements while complying with the privacy/confidentiality constraints.

Some embodiments implement a systematic method that enables the understanding of users' natural language requirements and translate them into the appropriate anonymization methods, using NLP and OM, that satisfy both parties' needs.

Figure 8:
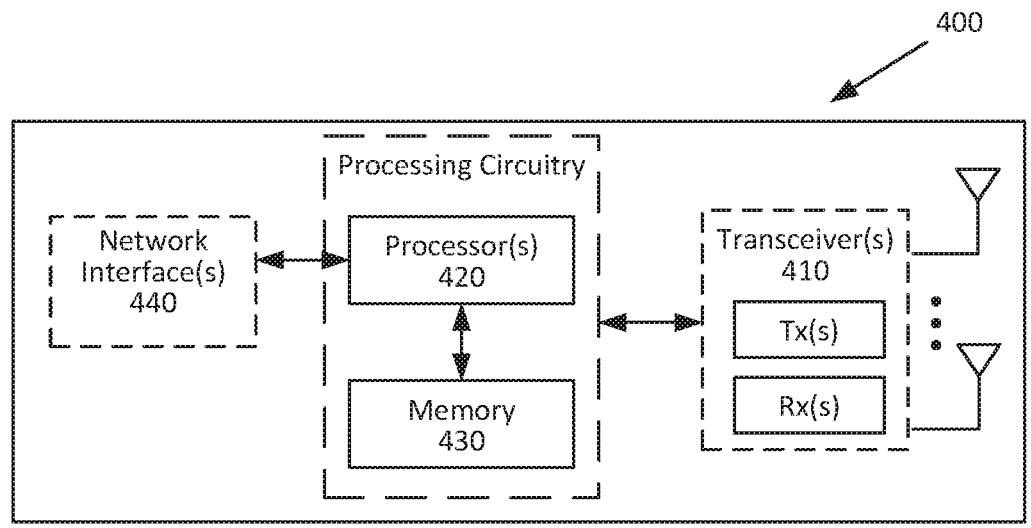
FIG. 8 is a block diagram of an example network node.

FIG. 8 is a block diagram of an exemplary network node, such as security node 400, in accordance with certain embodiments. Network node 400 can implement the various functionality of the iCAT system as described herein. Network node 400 may include one or more of a transceiver 410, processor 420, memory 430, and network interface 440. In some embodiments, the transceiver 410 facilitates transmitting wireless signals to and receiving wireless signals from wireless devices or other network node (e.g., via transmitter(s) (Tx), receiver(s) (Rx), and antenna(s)). The processor 420 executes instructions to provide some or all of the functionalities described above as being provided by a network node 400, the memory 430 stores the instructions executed by the processor 420. In some embodiments, the processor 420 and the memory 430 form processing circuitry. The network interface 440 can communicate signals to backend network components, such as a gateway, switch, router, Internet, Public Switched Telephone Network (PSTN), or other network nodes, etc.

The processor 420 can include any suitable combination of hardware to execute instructions and manipulate data to perform some or all of the described functions of network node 400, such as those described above. In some embodiments, the processor 420 may include, for example, one or more computers, one or more central processing units (CPUs), one or more microprocessors, one or more application specific integrated circuits (ASICs), one or more field programmable gate arrays (FPGAs) and/or other logic.

The memory 430 is generally operable to store instructions, such as a computer program, software, an application including one or more of logic, rules, algorithms, code, tables, etc. and/or other instructions capable of being executed by a processor 420. Examples of memory 430 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information.

In some embodiments, the network interface 440 is communicatively coupled to the processor 420 and may refer to any suitable device operable to receive input for node 400, send output from node 400, perform suitable processing of the input or output or both, communicate to other devices, or any combination of the preceding. The network interface 440 may include appropriate hardware (e.g., port, modem, network interface card, etc.) and software, including protocol conversion and data processing capabilities, to communicate through a network.

Other embodiments of network node 400 can include additional components beyond those shown in FIG. 8 that may be responsible for providing certain aspects of the node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIG. 8 may be included in other network nodes. Other network nodes may optionally include or not include a wireless interface (such as the transceiver described in FIG. 8).

Figure 9:
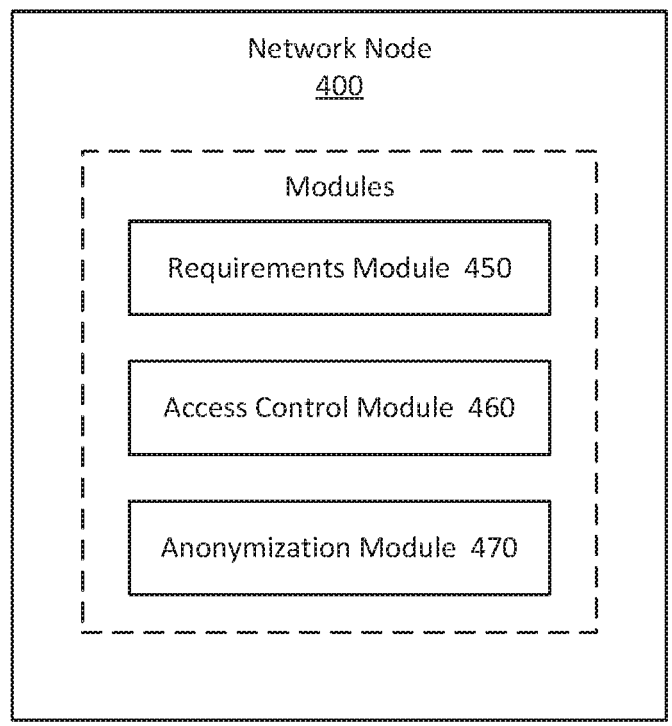
FIG. 9 is a block diagram of an example network node with modules.

In some embodiments, the network node 400, may comprise a series of modules configured to implement the functionalities of the network node described above. Referring to FIG. 9, in some embodiments, the network node 400 can comprise a requirements module 450 for receiving requirements from a data owner and/or a data processor, an access control module 460 for determining an anonymization method in accordance with the requirements, and an anonymization module 470 for generating anonymized data.

It will be appreciated that the various modules may be implemented as combination of hardware and software, for instance, the processor, memory and transceiver(s) of network node 400 shown in FIG. 8. Some embodiments may also include additional modules to support additional and/or optional functionalities.

Figure 10:
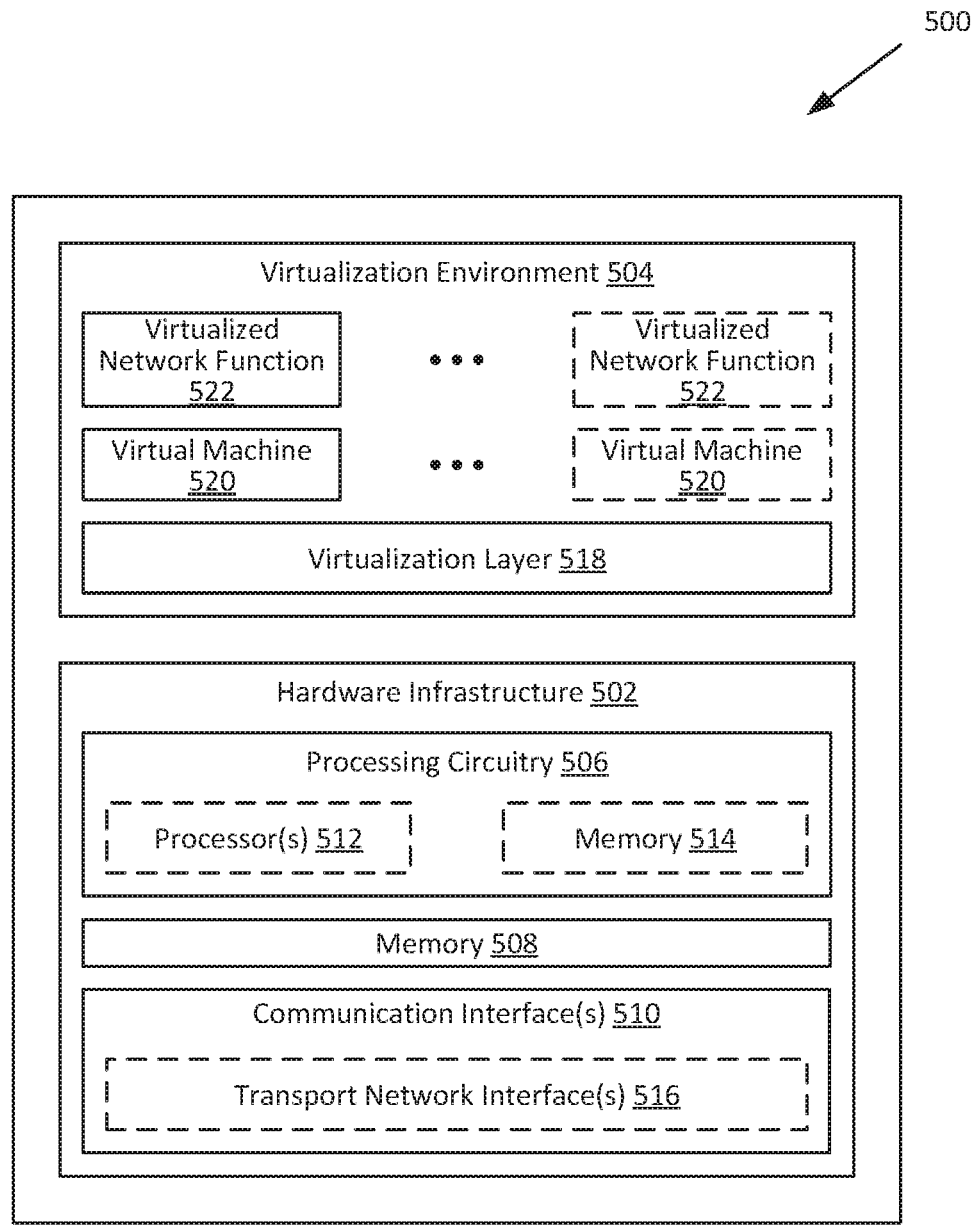
FIG. 10 is a block diagram of an example virtualized processing node.

Turning now to FIG. 10, some network nodes in the communication network may be partially or even entirely virtualized. As a virtualized entity, some or all the functions of a given network node are implemented as one or more virtual network functions (VNFs) running in virtual machines (VMs) hosted on a typically generic processing node 500 (or server).

Processing node 500 generally comprises a hardware infrastructure 502 supporting a virtualization environment 504.

The hardware infrastructure 502 generally comprises processing circuitry 506, a memory 508, and communication interface(s) 510.

Processing circuitry 506 typically provides overall control of the hardware infrastructure 502 of the virtualized processing node 500. Hence, processing circuitry 506 is generally responsible for the various functions of the hardware infrastructure 502 either directly or indirectly via one or more other components of the processing node 500 (e.g. sending or receiving messages via the communication interface 510). The processing circuitry 506 is also responsible for enabling, supporting and managing the virtualization environment 504 in which the various VNFs are run. The processing circuitry 506 may include any suitable combination of hardware to enable the hardware infrastructure 502 of the virtualized processing node 500 to perform its functions.

In some embodiments, the processing circuitry 506 may comprise at least one processor 512 and at least one memory 514. Examples of processor 512 include, but are not limited to, a central processing unit (CPU), a graphical processing unit (GPU), and other forms of processing unit. Examples of memory 514 include, but are not limited to, Random Access Memory (RAM) and Read Only Memory (ROM). When processing circuitry 506 comprises memory 514, memory 514 is generally configured to store instructions or codes executable by processor 512, and possibly operational data. Processor 512 is then configured to execute the stored instructions and possibly create, transform, or otherwise manipulate data to enable the hardware infrastructure 502 of the virtualized processing node 500 to perform its functions.

Additionally, or alternatively, in some embodiments, the processing circuitry 506 may comprise, or further comprise, one or more application-specific integrated circuits (ASICs), one or more complex programmable logic device (CPLDs), one or more field-programmable gate arrays (FPGAs), or other forms of application-specific and/or programmable circuitry. When the processing circuitry 506 comprises application-specific and/or programmable circuitry (e.g., ASICs, FPGAs), the hardware infrastructure 502 of the virtualized processing node 500 may perform its functions without the need for instructions or codes as the necessary instructions may already be hardwired or preprogrammed into processing circuitry 506. Understandably, processing circuitry 506 may comprise a combination of processor(s) 512, memory(ies) 514, and other application-specific and/or programmable circuitry.

The communication interface(s) 510 enable the virtualized processing node 500 to send messages to and receive messages from other network nodes (e.g., radio network nodes, other core network nodes, servers, etc.). In that sense, the communication interface 510 generally comprises the necessary hardware and software to process messages received from the processing circuitry 506 to be sent by the virtualized processing node 500 into a format appropriate for the underlying transport network and, conversely, to process messages received from other network nodes over the underlying transport network into a format appropriate for the processing circuitry 506. Hence, communication interface 510 may comprise appropriate hardware, such as transport network interface(s) 516 (e.g., port, modem, network interface card, etc.), and software, including protocol conversion and data processing capabilities, to communicate with other network nodes.

The virtualization environment 504 is enabled by instructions or codes stored on memory 508 and/or memory 514. The virtualization environment 504 generally comprises a virtualization layer 518 (also referred to as a hypervisor), at least one virtual machine 520, and at least one VNF 522. The functions of the processing node 500 may be implemented by one or more VNFs 522.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

The invention claimed is:

1. A method performed by a network node, the method comprising:
receiving a data set comprising a plurality of data attributes each having an associated attribute type;
obtaining privacy constraints associated with each of the plurality of data attributes;
determining a subset of available anonymization mechanisms for each of the plurality of data attributes in accordance with its associated privacy constraint and its associated attribute type;
obtaining utility requirements associated with one or more of the data attributes;
selecting a respective anonymization mechanism for each of the plurality of data attributes from its corresponding subset in accordance with its associated utility requirement; and
anonymizing the data set by applying each of the selected anonymization mechanisms to its corresponding data attribute.

2. The method of claim 1, further comprising, pre-processing the data set to remove a first set of data attributes.

3. The method of claim 1, further comprising, transmitting the anonymized data set to a data processor node.

4. The method of claim 1, wherein the privacy constraints are defined by a data owner for a given data processor.

5. The method of claim 1, wherein the privacy constraints specify a level of information to be shared for each of the data attributes.

6. The method of claim 1, wherein the utility requirements are defined by a data processor.

7. The method of claim 1, wherein the utility requirements specify a level of information required by a data processor to use the anonymized data set.

8. The method of claim 1, wherein selecting the respective anonymization mechanism for each of the plurality of data attributes includes selecting the anonymization mechanism having a maximum privacy level.

9. The method of claim 1, further comprising, generating an access control matrix by identifying all available anonymization mechanisms for each data attribute based on its attribute type.

10. The method of claim 9, wherein determining the subset includes translating the privacy constraints into a permission mask in the access control matrix.

11. A network node comprising processing circuitry and a memory storing instructions executable by the processing circuitry and configured to:
receive a data set comprising a plurality of data attributes each having an associated attribute type;
obtain privacy constraints associated with each of the plurality of data attributes;
determine a subset of available anonymization mechanisms for each of the plurality of data attributes in accordance with its associated privacy constraint and its associated attribute type;
obtain utility requirements associated with one or more of the data attributes;
select a respective anonymization mechanism for each of the plurality of data attributes from its corresponding subset in accordance with its associated utility requirement; and
anonymize the data set by applying each of the selected anonymization mechanism to its corresponding data attribute.

12. The network node of claim 11, further configured to pre-process the data set to remove a first set of data attributes.

13. The network node of claim 11, further configured to transmit the anonymized data set to a data processor node.

14. The network node of claim 11, wherein the privacy constraints are defined by a data owner for a given data processor.

15. The network node of claim 11, wherein the privacy constraints specify a level of information to be shared for each of the data attributes.

16. The network node of claim 11, wherein the utility requirements are defined by a data processor.

17. The network node of claim 11, wherein the utility requirements specify a level of information required by a data processor to use the anonymized data set.

18. The network node of claim 11, wherein selecting the respective anonymization mechanism for each of the plurality of data attributes includes selecting the anonymization mechanism having a maximum privacy level.

19. The network node of claim 11, further configured to generate an access control matrix by identifying all available anonymization mechanisms for each data attribute based on its attribute type.

20. The network node of claim 19, wherein determining the subset includes translating the privacy constraints into a permission mask in the access control matrix.

* * * * *